US005536479A

United States Patent [19]

Miller et al.

[11] Patent Number: 5,536,479

[45] **Date of Patent: *Jul. 16, 1996**

[54] SOLUBILIZING APPARATUS

[75] Inventors: Steven L. Miller, Shelbyville; Kerry L. Embry, Louisville, both of Ky.

[73] Assignee: International Purification Systems, Inc., Louisville, Ky.

[ * ] Notice: The term of this patent shall not extend beyond the expiration date of Pat. No. 5,393,502.

[21] Appl. No.: 323,627

[22] Filed: Oct. 17, 1994

Related U.S. Application Data

[63] Continuation of Ser. No. 117,505, Sep. 7, 1993, Pat. No. 5,393,502.

[51] Int. Cl.[6] .............................. B01D 11/02; B05D 1/34; G05D 11/02

[52] U.S. Cl. .......................... 422/261; 422/273; 422/275; 422/276; 422/277; 422/278; 422/281; 239/468; 239/469

[58] Field of Search .................................... 422/261, 264, 422/265, 266, 267, 272, 273, 274, 275, 276, 277, 278, 279; 239/468, 469; 210/634, 643, 644–646, 650–654, 657, 784, 787, 161, 304; 366/151, 165

[56] References Cited

U.S. PATENT DOCUMENTS

| | | | |
|---|---|---|---|
| Re. 32,818 | 1/1989 | Fernholz . | |
| 1,262,717 | 4/1918 | Vaudrevil | 422/274 |
| 1,321,037 | 11/1919 | Hedrick | 422/274 |
| 2,395,258 | 2/1946 | Drake . | |
| 2,521,869 | 9/1950 | Otto . | |
| 3,243,263 | 3/1966 | Schoenecker . | |
| 3,326,473 | 6/1967 | Wahlin | 239/468 |
| 3,385,567 | 5/1968 | Kolasinski . | |
| 3,606,290 | 9/1971 | Ransom . | |
| 3,684,457 | 8/1972 | Pinto et al. . | |
| 3,864,090 | 2/1975 | Richards . | |
| 4,026,673 | 6/1977 | Russo . | |
| 4,462,511 | 7/1984 | Fulmer . | |
| 4,664,314 | 5/1987 | O'Brien et al. | 239/469 |
| 4,664,891 | 5/1987 | Cosentino et al. . | |
| 4,784,771 | 11/1988 | Wathen et al. . | |
| 4,801,310 | 1/1989 | Bielefeldt | 210/788 |
| 4,816,222 | 3/1989 | Fagrell | 422/261 |
| 4,956,176 | 9/1990 | Moorman . | |
| 5,016,514 | 4/1992 | Alexander | 210/788 |
| 5,269,949 | 12/1993 | Tuszko et al. | 210/788 |

*Primary Examiner*—Robert J. Warden
*Assistant Examiner*—Christopher Y. Kim
*Attorney, Agent, or Firm*—Middleton & Reutlinger; Charles G. Lamb

[57] ABSTRACT

A solubilizing apparatus includes a fluid permeable sleeve having opposed openings therein wherein a spray nozzle is in flow communication with one opening and a second opening is disposed to receive solids. The spray nozzle is designed to spray a fluid in a swirling spray sweeping the insides of the sleeve wall as it travels toward the opposite end. The solubilizing apparatus is specifically useful for dissolution of chemicals utilized in cleaning reverse osmosis membranes.

9 Claims, 2 Drawing Sheets

SOLUBILIZING APPARATUS

This is a Continuation Application of U.S. patent Ser. No. 08/117,505 filed Sep. 7, 1993, now U.S. Pat. No. 5,393,502.

BACKGROUND OF THE INVENTION a) Field of the Invention.

This invention relates to solubilizing apparatuses. More particularly, the present invention relates to an apparatus and method for dissolving salts. Even more particularly, the present invention relates to the use of fluid permeable materials in a solubilizing apparatus.

b) Background of the Invention

In the solubilizing of salts, the salts are generally dissolved batch-wise by adding a predetermined amount of salt into a container including a liquid therein, usually water. The water is preferably at a preselected temperature sufficient to dissolve the said salts to a selected concentration and maintained at said preselected temperature during the solubilizing of the salt materials. Agitation means are provided to move the salt compounds into contact with the water in a very rapid and violent manner. The agitation continues until the salts are dissolved.

There are also known solubilizing systems which include in-line metering devices which feed solid materials into a flowing liquid in a conduit at a preselected rate. As the liquid flows through the conduit, the solid crystalline materials proceed to dissolve. However, continuous systems are generally used when the concentration of solute is to be relatively low and the salts are easily dissolved.

Presently in the solubilizing of highly osmotically active salts for use on reverse osmosis membranes for removal of membranes scales and plugs thereby cleaning the reverse osmosis membranes for further use, the resulting highly osmotically active solutions to be utilized are prepared ahead of time in a container remote from the machine which includes the reverse osmosis membranes therein. Generally, machines, which include these reverse osmosis membranes, include holding containers therein which include the solubilized highly osmotically active materials. In making up the solutions for use in cleaning these membranes, the holding containers are removed from the machine and filled with a suitable liquid for use in the cleaning. Selected crystalline salts which are used in the cleaning process are then poured into the container and the container is continuously stirred until all of the crystalline salts are completely dissolved. The container is then reattached to the machine.

U.S. Pat. No. 4,664,891 teaches a dialysis concentrate solution preparation from packaged chemicals wherein chemicals to be dissolved are loaded into a container. Water is metered into a mix tank and then sprayed onto the chemicals in the container. The resulting slurry and dissolved chemicals are then removed by a suction wand and transferred to the mix tank for further use.

SUMMARY OF THE INVENTION

The present invention provides a solubilizing apparatus which provides for rapid solubilization. The present invention further provides a solubilizing apparatus for in-line operation which operates at very low pressures. The present invention even further provides a solubilizing apparatus which has no moving parts. Furthermore, the present invention provides a solubilizing apparatus which is low in cost, easily maintained and economical in operation. Particularly, the present invention provides a solubilizing apparatus which includes a fluid permeable sleeve and a spray means disposed therein wherein the spray means sprays a liquid in a preselected pattern and under sufficient pressure to sweep the inner walls of the fluid permeable sleeve.

More particularly, the present invention provides a solubilizing apparatus comprising: a fluid spray means; a container having a fluid permeable wall; a fluid inlet into said container, said fluid inlet being in flow communication with said liquid spray means; and means to add a substance to be solubilized to said container.

In the use of the terms "solubilize", "solubilized", and "solubilizing" in the present application, it is understood that substances which are "dispersed", "aerated", "emulsified" and the like are broadly included therein as it is realized that even though a preferred embodiment of this invention is to solubilize salts, the solubilizing apparatus may also, for example, disperse substances in a liquid medium, aerate a liquid medium without dissolution, and form emulsified solutions. And, such processes are intended to be a part of our invention as described and claimed herein.

BRIEF DESCRIPTION OF THE DRAWINGS

A better understanding of the present invention will be had upon reading the following description in conjunction with the accompanying drawings in which like parts are identified by like numbers and wherein.

DETAILED DESCRIPTION OF THE PREFERRED EMBODIMENT

Figure 1:
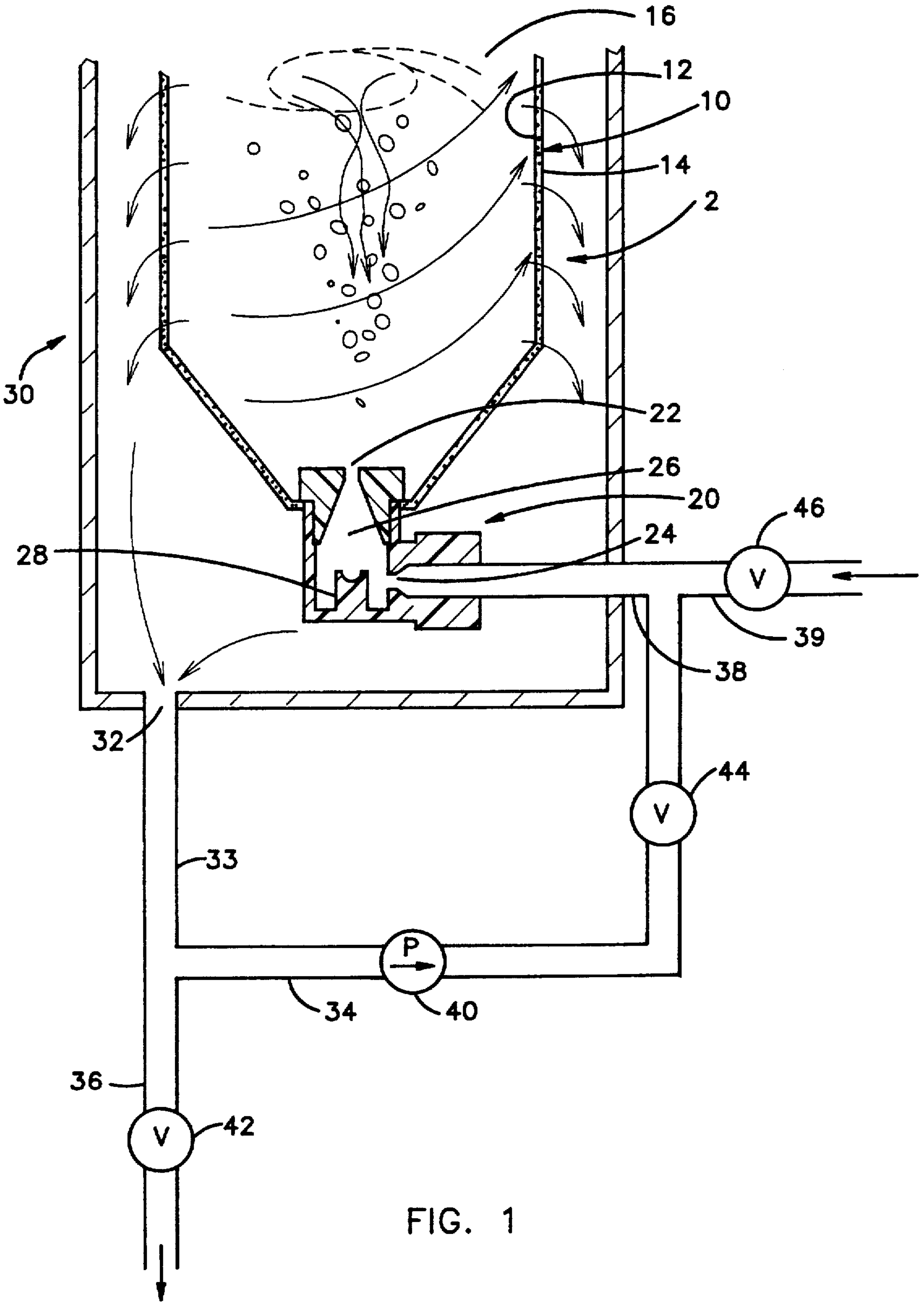
FIG. 1 is a schematic view of one system including a solubilizing apparatus of the present invention; and, FIG. 2 is an enlarged exploded view of a solubilizing apparatus of the present invention.

FIG. 1 shows a schematic view of a solubilizing apparatus 2 of the present invention which includes a solubilizing container exemplified as a permeable sleeve 10 having a fluid permeable wall defined by an inner wall 12 and an outer wall 14. The fluid permeable sleeve 10 shown is a porous pipe. One preferred porous pipe for use, for example, in the solubilizing of salts for use in or with a water purifying machine is one made of sintered polypropylene beads, wherein the nominal core diameter is from 100 to 150 microns and preferably approximately 125 microns. One preferred sleeve 10 has an outside diameter 2 ½" to 3.0" and a wall thickness of from 0.10" to 0.15". The preferred length is approximately 8 inches in length wherein the void volume of the material will be about 40 per cent. This type of fluid permeable sleeve 10 allows an almost unrestricted flow through its walls with only a small amount of head pressure.

Figure 2:
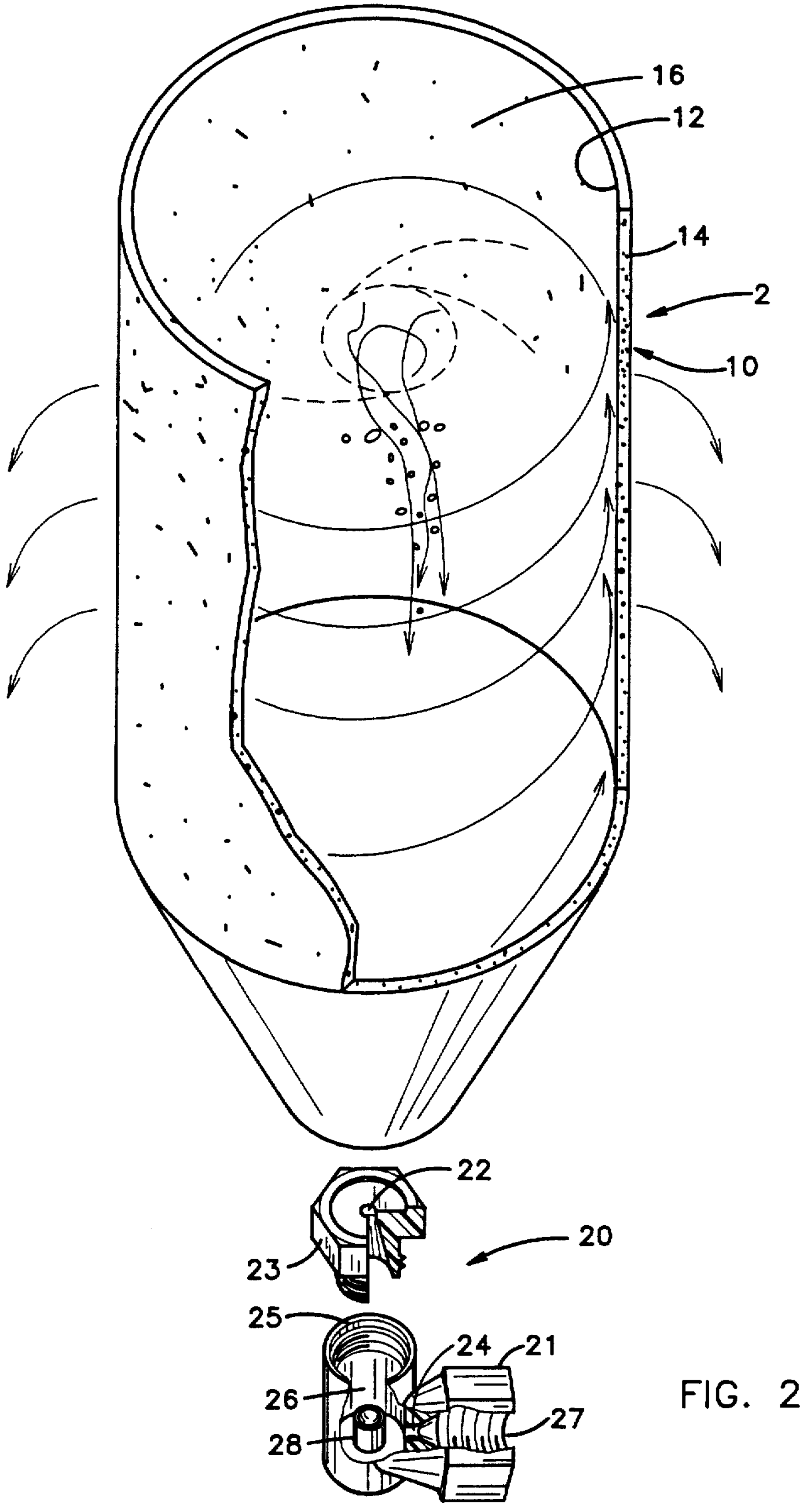

The solubilizing apparatus 2 also includes a spray nozzle 20 with an outlet opening or orifice 22 therein, which provides a spray into the opening in the bottom of the sleeve 10. As best shown in FIG. 2, the spray nozzle 20 is a polypropylene spray nozzle manufactured by Spraying Systems, Inc. and referred to as their WhirlJet type. The spray nozzle 20 is in two pieces, a body portion 21 and a plug portion 23 which is threadably attached to outlet 25 of the body 21. A water inlet 27 is also provided into the body 21 as the connecting means to a water supply source, such as conduit 38 in FIG. 1. The fluid permeable sleeve 10 is generally disposed to fit directly over the outlet of the spray nozzle 20 so that the water leaving through the outlet orifice 22 is directed toward and against the inner wall 12 of the permeable sleeve 10 thereby sweeping the wall 12 preventing the build-up of solids therealong.

Shown in the schematic of FIG. 1 is one system for use of the solubilizing apparatus 2. The solubilizing apparatus 2 is disposed within a water or liquid impermeable tank 30, such as a polyvinyl chloride container with an outlet 32. An outlet conduit 33 is provided for flow of the liquid out of the container outlet 32 and the outlet conduit 33 is in flow communication with a recirculating conduit 34 and a discharge line or conduit 36. The flow from the container 30 then may either be taken to use through discharge conduit 36 or recirculated through recirculation conduit 34. In recirculation of the liquid, crystalline salts can be continually fed through the opening 16 in the water permeable sleeve 10, thereby continually increasing the concentration of dissolved material within the liquid until a desired concentration of solute is achieved. A recirculation pump 40 is provided within line 34 as the means for pumping the liquid solution from the container 30 back to the solubilizing apparatus 2. Also provided is a water inlet conduit 39 which is the source of water for supplying fresh liquid to the solubilizing apparatus 2.

Also disposed within the discharge line 36, the recirculating line 34, and the water inlet conduit 39 are valves 42, 44, and 46, respectively. The opening and closing of valves 42, 44, 46 define the flow of the liquids during the operation of the solubilizing apparatus 2. These valves 42, 44 and 46 may be any type known in the art. Preferred valves are solenoid type valves which are operable in response to either automatic analyzing results from a centrally controlled computer station or manually in response to a desired function for the solubilizing apparatus 2. However, since common control of solenoid valves in the circulation of liquids is well known in the art, detailed explanation of these valves in the exemplified solubilizing system will not be discussed.

In one preferred operation of the solubilizing apparatus 2 of the present invention, valve 46 is opened and water is added through the water inlet conduit 39 while valves 42 and 44 are closed and pump 40 is off. Water continues to flow through the conduit 39 into the spray nozzle 20 and into the fluid permeable sleeve 10 where it diffuses through the wall of the sleeve 10 and into the container 30. Simultaneously, material, such as crystalline salts, which are to be dissolved in the water are added into the fluid permeable sleeve 10 through the opening 16. As the solids are fed into the opening 16, because of the low pressure created by the spray 20, the salts tend to fall downwardly through the central portion of the flowing spray from the spray nozzle wherein the salts are picked up in the spray as the spraying water flows in an upwardly direction sweeping the inner wall 12 of sleeve 10. As the salts are picked up in the water spray the salt particles are vigorously agitated, dissolve, and diffuse in solution through the walls of the permeable sleeve 10 into container 30. Once a sufficient supply of water is received in the container 30, the valve 46 is closed, valve 44 is opened, and the recirculating pump 40 is turned on. In this case, the liquid solution is recirculated from the container 30 through recirculating line 34, spray nozzle 20 and into the fluid permeable sleeve 10. More salts are added through the opening 16 thereby gradually increasing the concentration of solute until the desired concentration of solute is obtained. The liquid flowing through the recirculating line 34 is continued until all of the salts have been dissolved. When this occurs, pump 40 is cut off, and the valve 44 is closed. The solution is then ready for use. One such use is a cleaning solution for use in the cleaning of reverse osmosis permeable membranes in a water purification system for a hemodialysis machine. One such system is described in U.S. Pat. No. 4,784,771. However, it is realized that other uses of the solubilizing apparatus may become apparent to those skilled in the art as the solubilizing apparatus is not meant to be directed specifically for use with reverse osmosis membranes.

In the use of the spray nozzle 20 of the present invention, the hollow cone spray pattern is generated by the flow path of the water through the spray head. Water enters the spray nozzle 20 through an orifice 24 sized to yield a particular flow rate at a preselected water pressure. The water then passes through the orifice 24 and enters the vortex chamber 26 tangentially. Water then spins around the baffle 28 at high velocity to produce a centrifugal force. The water then leaves the spray nozzle 20 through the outlet orifice 22 and exits at a well defined angle, preferably at about 80°. The hollow cone spray pattern forms a sheet in the shape of a cone and the water exiting the outlet orifice 22 is traveling at a relatively high velocity, but relatively low volume. This high velocity conical sheet of water enters the water permeable sleeve 10 thereby sweeping the walls 12 of the sleeve, which prevents the occlusion of the openings in the wall of the sleeve 10. Moreover, it has been found that this sheet of water also, to a large extent, stratifies in flow velocities. That is, it is made up of lines of high velocity flow alternating with low velocity lines of flow. Lines at the lower velocity are at a much higher soluble concentration during the make-up of a solution and thereby contains less of the fresh water which is exiting the spray nozzle 20. The low velocity regions of the spray pattern are allowed to weep through the walls of the fluid permeable sleeve 10. Since the low and high velocity stratifications are so closely adjacent to each other, any particle residing in the low velocity stream will not remain there long. Each particle is in an area of flow which is highly unstable and the particle will quickly be swept away by the high velocity stream as water flows out of the fluid permeable sleeve 10 due to the influence of the head pressure in the sleeve 10. It has been found that without any solids being introduced for dissolution in the present example hereinbefore described, the water level resides at about 1 ½" to about 3" above the spray nozzle 20. As crystalline salts are added, the level rises due to the increase in total volume conferred by the solute/solvent slurry. The outlet rate increases due to the added head pressure. However, the upper one-third of the exemplified sleeve 10 becomes occluded due to the lower fluid velocity as the total flow is not directly proportional to head pressure and is somewhat reduced. If the addition of salts through the inlet 16 is increased, the fluid level in the sleeve 10 simply rises and increases the head pressure which in turn increases the outflow rate through the walls of the sleeve 10 matching that rate to the sum of the liquid and solids inflow rates. For example, it has been found that inflow rates can double, that is increase by 100 per cent, and the fluid or liquid level will rise by about only 40 per cent. Thus, the liquid level tends to remain constant and changes little with moderate changes in addition rate.

Even though the preferred embodiment includes a solids inlet opening 16 at one end of sleeve 10 in spaced alignment with spray nozzle 20 at the opposite end of sleeve 10, opening 16 may also be through walls 12, 14 if more convenient. Furthermore, opening 16 may also include a cover thereover, if such is preferred.

In the preferred embodiment, the sleeve 10, is shown as being cylindrical in shape, however, it is recognized for specific applications sleeve 10 may take the form of different shapes, such as, elliptical, rectangular, and the like. In the configuration of various shapes other than cylindrical for the sleeve 10 it is essential that the spray nozzle 20 chosen for the specific configuration be selected so that the liquid spray from the nozzle 20 will sweep the inner walls of the sleeve 10 thereby preventing the occlusion of solids along the inner wall 12 thereof. Furthermore, the solubilizing container may include containers having solid walls with selected walls or portions thereof being fluid permeable.

It can be realized that other changes may be made to the specific embodiment shown and described without departing from the scope and spirit of the present invention.

What is claimed is:

1. A solubilizing apparatus comprising:

a solubilizing container having a fluid permeable sleeve mounted therein with an inner fluid permeable wall;

a fluid inlet at a bottom of said container;

a fluid spray means within a bottom of said sleeve in fluid communication with said fluid inlet, said spray means including means for spraying fluid in an upwardly pattern sweeping against the inner wall of the permeable sleeve with a vortex at the center of said pattern, said pattern having a higher flow velocity at an outer extremity than at the center; and means to add a substance to be solubilized into a top of said permeable sleeve.

2. The solubilizing apparatus of claim 1, wherein said fluid permeable sleeve is a porous pipe of sintered polypropylene beads.

3. The solubilizing apparatus of claim 1, said fluid permeable sleeve having a nominal pore diameter of from about 100 to 150 microns.

4. The solubilizing apparatus of claim 1, wherein said fluid spray means includes a spray nozzle, said spray nozzle having a fluid inlet and a fluid outlet, said spray nozzle including means therein to spray fluid through said outlet in a preselected spray pattern, said preselected spray pattern being defined to provide a fluid spray along said fluid permeable wall.

5. A method of solubilizing a chemical including the steps of:

providing a solubilizing container having a fluid permeable sleeve mounted therein with an inner fluid permeable wall, a fluid inlet at a bottom of said container, a fluid spray means within a bottom of said sleeve in flow communication with said fluid inlet, said spray means including means for spraying fluid in an upwardly pattern in a circular motion sweeping against an inner wall of the permeable sleeve with a vortex at the center of the pattern, said pattern having a higher flow velocity at an outer extremity than at the center, and means to add a substance to be solubilized to a top of said permeable sleeve;

spraying fluid in said preselected pattern to said sleeve;

adding a chemical to be solubilized into the top of said sleeve;

solubilizing said chemical; and receiving solubilized chemical passing through said fluid permeable inner wall of said sleeve.

6. The method of claim 5 wherein said container is a cylindrical sleeve and said step of spraying said fluid includes spraying said fluid in a conical-shaped vertical upward direction sweeping the fluid permeable wall of said sleeve.

7. The method of claim 5 wherein said spraying fluid is a liquid.

8. The method of claim 5 wherein said fluid permeable sleeve is a porous pipe of sintered polypropylene.

9. The method of claim 5, said fluid permeable sleeve having a nominal pore diameter of from 100 to 150 microns.

* * * * *